March 11, 1958 Y. T. SIHVONEN 2,826,692

TRANSISTOR PULSE GENERATOR

Filed Dec. 31, 1954

INVENTOR
Yro T. Sihvonen
BY L. D. Burch
ATTORNEY 2,826,692

TRANSISTOR PULSE GENERATOR

Yro T. Sihvonen, Birmingham, Mich., assignor to General Motors Corporation, Detroit, Mich., a corporation of Delaware Application December 31, 1954, Serial No. 479,023

3 Claims. (Cl. 250—36)

This invention relates to electronic pulse generators for producing a series of spaced pulses and, more particularly, to a free-running pulse generator utilizing a semi-conductor transistor device.

The invention has for its objects to provide a novel transistor pulse generator circuit which utilizes a minimum number of circuit components and voltage sources and which generates a series of square waves of desirable width, height and repetition rate, with good form factor, stability and very low power consumption.

Figure 1:
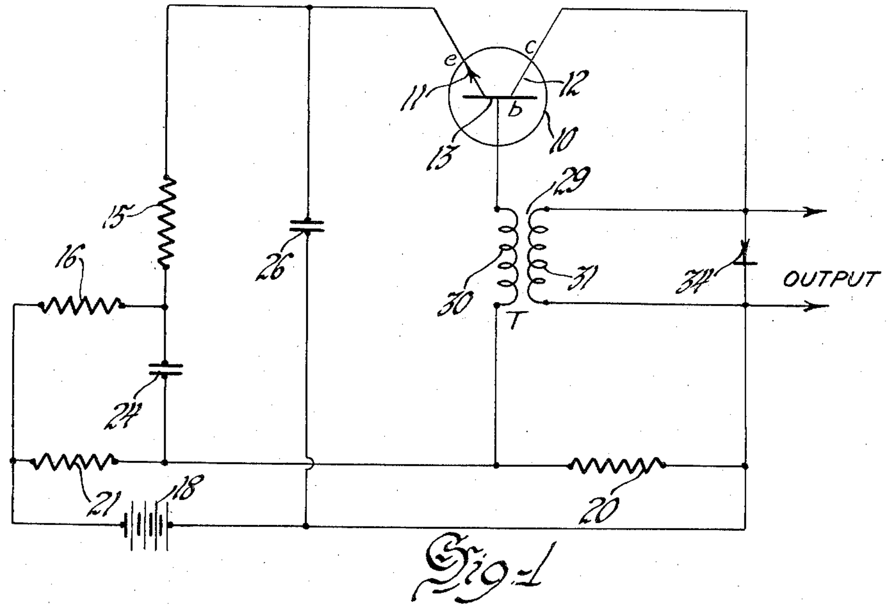

The above and other objects, together with the features and advantages of the present invention, will appear more fully from the following description and drawings wherein:

Fig. 1 is a schematic electric circuit diagram of a free-running transistor pulse generator in accordance with the present invention; and Figs. 2 to 5 are wave forms of voltages which appear across various of the circuit components of Fig. 1 and which aid in understanding the operation of the invention.

Referring to Fig. 1, 10 is a semi-conductor device such as a type NPN junction transistor having an emitter electrode 11, collector electrode 12 and base electrode 13. One transistor found satisfactory for use herein is a type #2517 NPN transistor obtained from Germanium Products Corporation of Jersey City, New Jersey. The emitter electrode is connected over a pair of series resistors 15, 16 to the negative terminal of a D. C. source, indicated as a battery 18, which is the sole source of power employed in the circuit and supplies the necessary operating voltages therefor.

Connected from the positive to the negative terminal of the battery is a voltage divider composed of a pair of series resistors 20, 21, the junction point of which is connected to the junction point of the resistors 15, 16 through a capacitor 24. A second capacitor 26 is connected from the emitter electrode 11 directly to the positive terminal of the battery.

The base electrode 13 of the transistor is connected through the primary winding 30 of a coupling transformer 29 to the junction point of the voltage divider resistors 20, 21. The collector electrode 12 of the transistor is connected through a parallel circuit composed of the secondary winding 31 of the transformer 29 and a diode type semi-conductor 34 to the positive terminal of the battery 18.

Depending upon the design frequency of the pulse generator the transformer 29 can be either of the iron core or air core variety. The diode semi-conductor device 34 may be a silicon or germanium detector or rectifier such as a type IN–34 element, such as is available from Sylvania Electric Products, Inc., for example.

Typical valves for the above described circuit components are listed below.

| | |
|---|---|
| Resistors 15; 16; 21; 20 | 150; 10,000; 15,000; 10,000 ohms. |
| Capacitors 24; 26 | 0.1; 10 micro-farads. |
| Battery 18 | 22.5 volts. |

Figure 2:
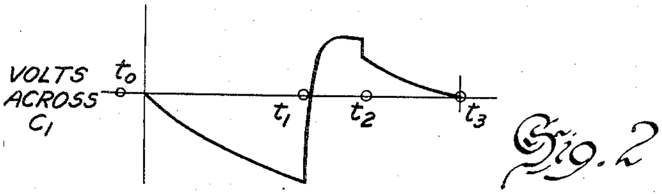
Figure 4:
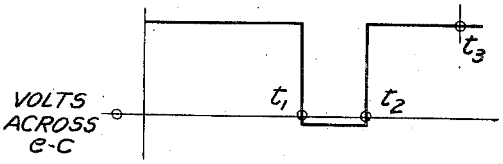

The operation of the system is as follows: when the voltage source 18 is connected to the circuit, capacitor 24 begins to charge as indicated in Fig. 2, by reason of the voltage across resistor 21, through charging resistor 16. Effectively connected across the capacitor 24 are the emitter and base of the transistor. Initially these electrodes are at substantially the same potential, and the transistor will be in a non-conducing condition with the voltage of the battery appearing across the emitter-collector terminals as shown in Fig. 4.

Figure 3:
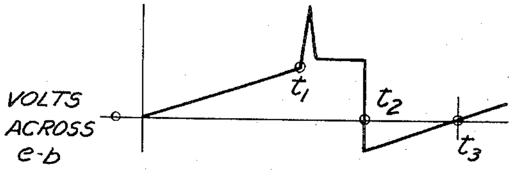

As the charge on capacitor 24 increases, the emitter electrode 11 becomes negative relative to the base electrode 13 as indicated in Fig. 3, causing the transistor to conduct at a time $t_1$, and the capacitor begins to discharge in a path from the upper negatively charged plate or side of the capacitor through resistor 15, the emitter-to-collector path of the transistor, the secondary winding 31 of transformer 29, and resistor 20 back to the positively charged side of the capacitor. The diode 34 presents a high impedance to electron current flow in the above-described path so that the discharge current flows entirely through the secondary winding of the transformer.

The discharge current released through the collector electrode of the transistor builds up a voltage across the secondary winding 31 of the transformer and induces a voltage indicated by the spike on the wave of Fig. 3, across the transformer primary winding 30, which is connected to make the transistor base electrode 13 more positive. As a result, the discharge of the capacitor 24 is accelerated until the capacitor is completely discharged, and then becomes charged in the opposite direction by reason of the induced voltage appearing across the primary winding 30 of the coupling transformer 29.

As a result of the change in polarity of capacitor 24 in the interval $t_1$–$t_2$ of Fig. 2, the emitter electrode 11 becomes more positive, tending to lower the conductivity of the transisor. This factor, coupled with the fact that the induced current through the primary of the transformer ceases to flow because the time rate of change in transformer flux has become zero, begins to cut off the current flow into the transistor collector. The decreased current flow in the collector circuit induces a voltage across the transformer primary of opposite polarity to that originally induced when the transistor initially became conducting. This voltage makes the transistor base even more negative, thereby completing the cut-off action and the voltage across secondary winding 31 returns to its original value. Capacitor 24 then discharges through resistors 16 and 21, until original conditions are restored, and then begins to charge in its original direction through resistor 16 to re-start the cycle.

Figure 5:
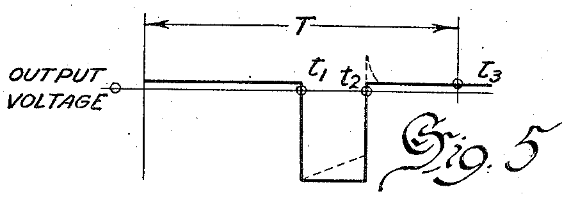

Capacitor 26, which is charged by the voltage of the battery through resistors 15 and 16, discharges through the transistor during the interval $t_1$–$t_2$, while capacitor 24 has discharged and has been oppositely recharged by the voltage induced in the transformer primary winding, and serves to supply additional current flow through the transistor during this interval to maintain the flatness of the output wave form shown in Fig. 5. In the absence of the capacitor 26 the wave shape of the output voltage shown in Fig. 5 would not be flat during the interval $t_1$–$t_2$, but would assume the form indicated by the dashed line.

The diode limiter 34 serves to clip a small voltage overshoot that is indicated by the dashed spike in Fig. 5 and is caused by the collapsing field in the secondary winding 31 of the transformer after the transistor has been cut off. This momentary overshoot tends to cause a reverse current flow in the transistor output in the opposite direction to the original current flow therein, but in the presence of the diode limiter, it is effectively short circuited thereby so that a square wave output voltage of good wave form is attained.

The resistor 16 determines the charging rate of the capacitor 24 and, therefore, the pulse repetition rate of the system. The resistor 15 determines the rate of discharge of the capacitor 24 and thus controls the pulse width. The size of the capacitor 24 affects both the pulse repetition rate and the pulse width. So as to supply a sufficient number of electrons during the interval $t_1$–$t_2$ while the capacitor 24 discharges in one direction and recharges in the opposite direction, the capacitor 26 should be of large capacitance and have a longer discharge rate or time factor in relation to the combined discharge and charging rates of the capacitor 24. And in order that the capacitor 24 may recharge rapidly by the induced voltage across the primary 30 of the transformer 29, it is desirable that the primary of the transformer be of low inductive reactance during the recharging cycle of the capacitor 24.

With a suitable selection of circuit components, the pulse generator described will generate a variety of square waves of desirable width, height and repetition rate.

What is claimed is:

1. A pulse generator circuit comprising the combination of a semi-conductor transistor device having an emitter electrode, a collector electrode and a base electrode, a source of power, a charging circuit including a first capacitor and means connecting said charging circuit across a portion of said power source, means connecting said emitter electrode in circuit with one side of said first capacitor, an auxiliary capacitor of large capacitance relative to said first capacitor and means connecting said auxiliary capacitor to said emitter electrode and said source of power, a coupling transformer including a primary winding and a secondary winding, and means connecting said secondary winding to said collector electrode and said source of power and said primary winding between said base electrode and the other side of said first capacitor.

2. The combination in accordance with claim 1 above including reverse current limiting means connected across said transformer secondary winding.

3. A pulse generator circuit comprising the combination of a semi-conductor transistor device having an emitter electrode, a collector electrode and a base electrode, a source of power, a charging circuit including a capacitor and means connecting said charging circuit to be charged from said power source, means connecting said emitter electrode to one side of said capacitor and said base electrode to the other side thereof, an output impedance, means connecting said output impedance in circuit with said collector electrode and said source of power therefor, an additional capacitor of large capacitance relative to said first-mentioned capacitor and means connecting said additional capacitor to said emitter electrode and said source of power.

References Cited in the file of this patent

UNITED STATES PATENTS

| | | |
|---|---|---|
| 2,683,809 | Fromm | July 13, 1954 |
| 2,745,012 | Felker | May 8, 1956 |

OTHER REFERENCES

Article: "Point-Contact and Junction Transistors," by Doremus, pages 14–20, Radio and Television News, vol. 47, No. 4, for April 1952.